(12) United States Patent
Ha

(10) Patent No.: US 7,793,460 B2
(45) Date of Patent: Sep. 14, 2010

(54) ANIMAL TRAP

(76) Inventor: Heung Y. Ha, 8918 Mountain Ash Dr., Springfield, VA (US) 22153

( * ) Notice: Subject to any disclaimer, the term of this patent is extended or adjusted under 35 U.S.C. 154(b) by 0 days.

(21) Appl. No.: 11/932,935

(22) Filed: Oct. 31, 2007

(65) Prior Publication Data

US 2009/0107029 A1 Apr. 30, 2009

(51) Int. Cl.
*A01M 23/18* (2006.01)
(52) U.S. Cl. .................... 43/61; 43/58; 49/394
(58) Field of Classification Search ........... 43/61, 43/66, 67, 73, 74, 58, 60, 65; 119/524, 481; 292/342; 220/241, 244, 254.1, 254.3, 254.5, 220/315, 324, 810, 825, 826, 833, 835, FOR. 192, 220/FOR. 193, FOR. 203; 49/394
See application file for complete search history.

(56) References Cited

U.S. PATENT DOCUMENTS

| 488,996 | A | * | 1/1893 | Fry ........................ 43/66 |
|---|---|---|---|---|
| 1,191,706 | A | * | 7/1916 | Kesler .................... 43/66 |
| 1,866,776 | A | * | 7/1932 | Sloulin ................... 43/61 |
| 1,918,266 | A | * | 7/1933 | Henry ..................... 43/61 |
| 1,996,872 | A | * | 4/1935 | Long ...................... 43/61 |
| 2,023,427 | A | * | 12/1935 | Laughlin .................. 43/61 |
| 3,426,470 | A | * | 2/1969 | Rudolph ................... 43/61 |
| 3,918,194 | A | * | 11/1975 | Waske ..................... 43/61 |
| 3,975,857 | A | * | 8/1976 | Branson et al. ............ 43/61 |
| 4,142,320 | A | * | 3/1979 | Marcolina et al. .......... 43/61 |
| 4,179,835 | A | * | 12/1979 | Hunter .................... 43/61 |
| 4,413,439 | A | * | 11/1983 | Lindley ................... 43/61 |
| 4,557,067 | A | | 12/1985 | Ha |
| 4,703,582 | A | * | 11/1987 | DeSena .................... 43/61 |
| 4,744,170 | A | * | 5/1988 | Chow ...................... 43/61 |
| 4,782,620 | A | * | 11/1988 | Syszczyk et al. ........... 43/61 |
| 4,829,700 | A | | 5/1989 | Ha |
| 5,050,336 | A | * | 9/1991 | Paassen ................... 43/61 |
| 6,189,490 | B1 | * | 2/2001 | Jempolsky ................. 119/497 |
| 6,484,672 | B1 | * | 11/2002 | Versaw .................... 119/751 |
| 6,564,501 | B1 | * | 5/2003 | Schislyonok ............... 43/61 |

FOREIGN PATENT DOCUMENTS

FR 2757744 * 12/1996
GB 2085704 * 5/1982

* cited by examiner

*Primary Examiner*—Rob Swiatek
*Assistant Examiner*—Danielle Clerkley
(74) *Attorney, Agent, or Firm*—Birch, Stewart, Kolasch & Birch, LLP

(57) ABSTRACT

An animal trap include, a housing having an open end, a door pivotally mounted to the housing and movable between an open position and a closed position, the door including a slit therein at a lower portion of the door to form an elastic portion below the slit, a close latch provided on the housing near the open end, the close latch cooperable with the elastic portion to retain the door in the closed position by latching the elastic portion between the close latch and the door stop.

20 Claims, 7 Drawing Sheets

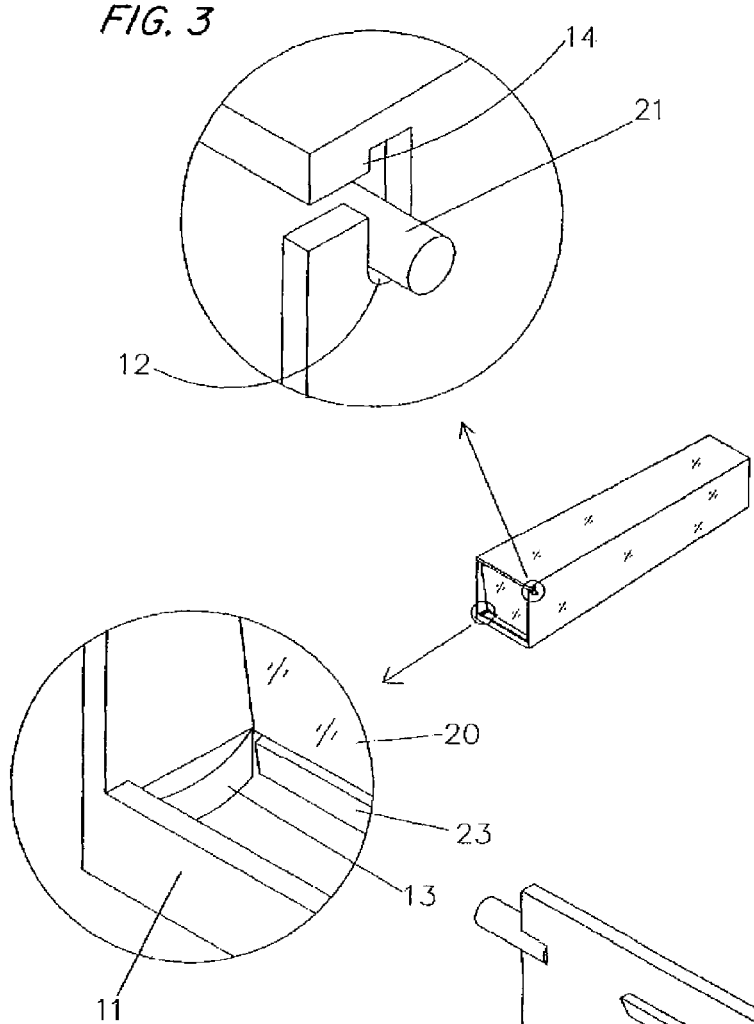
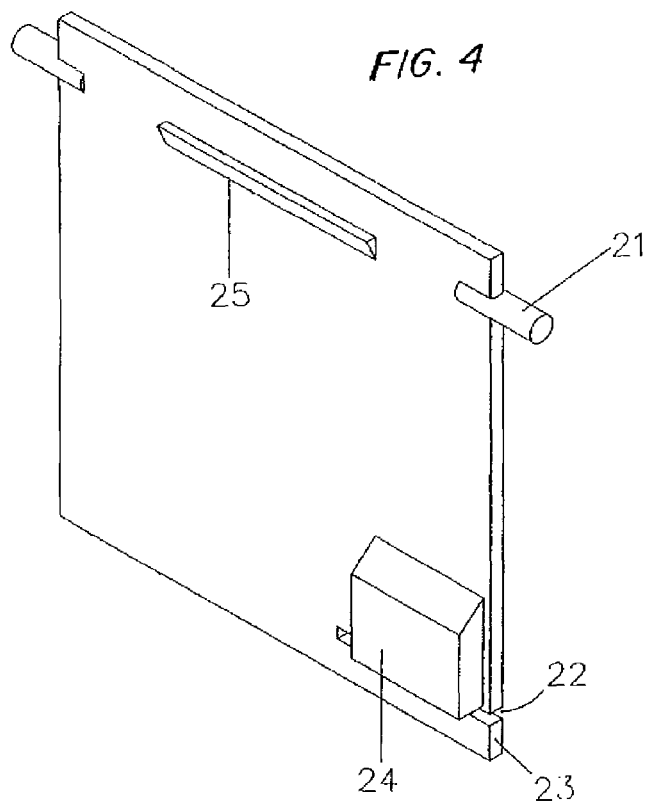

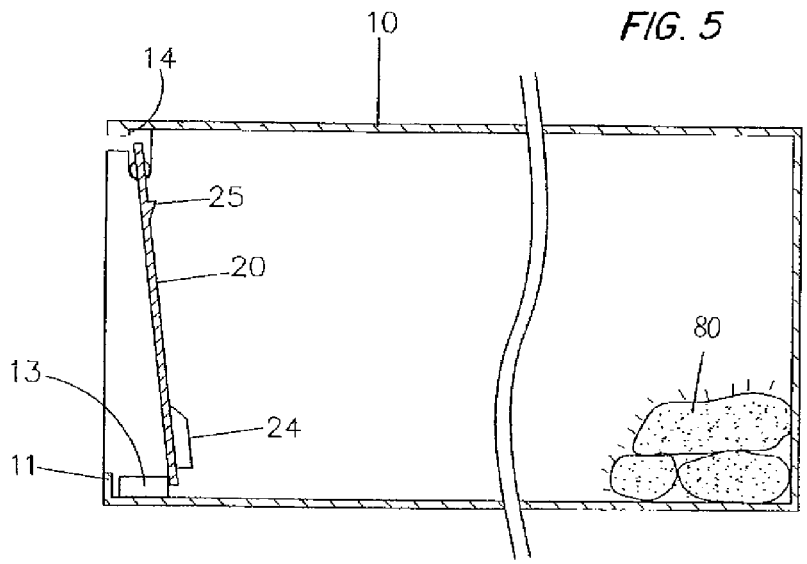
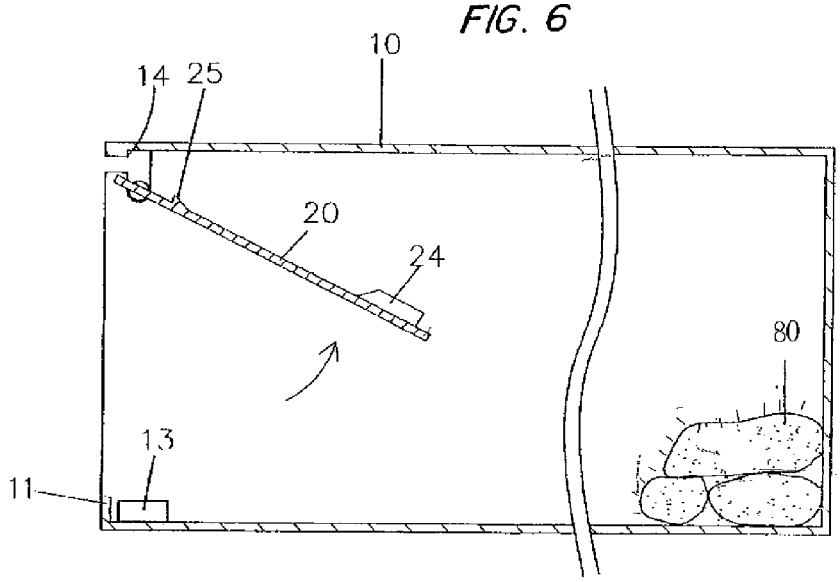
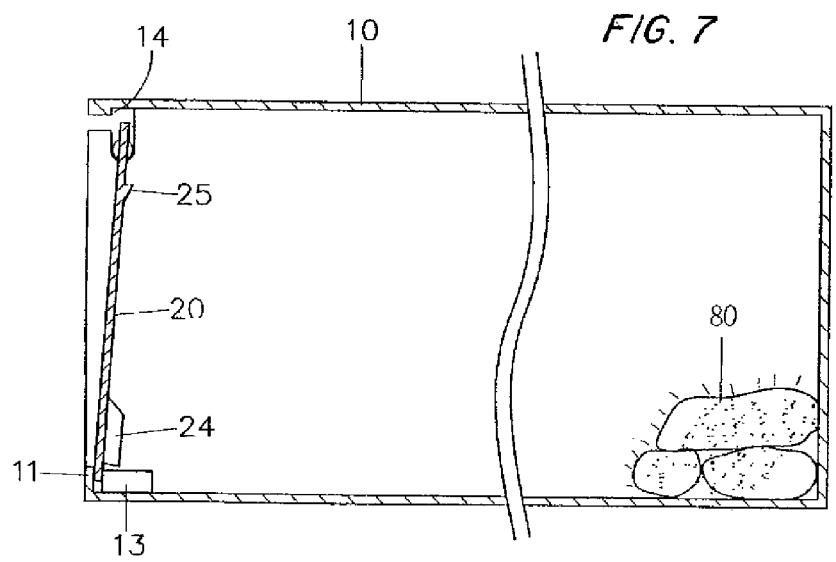

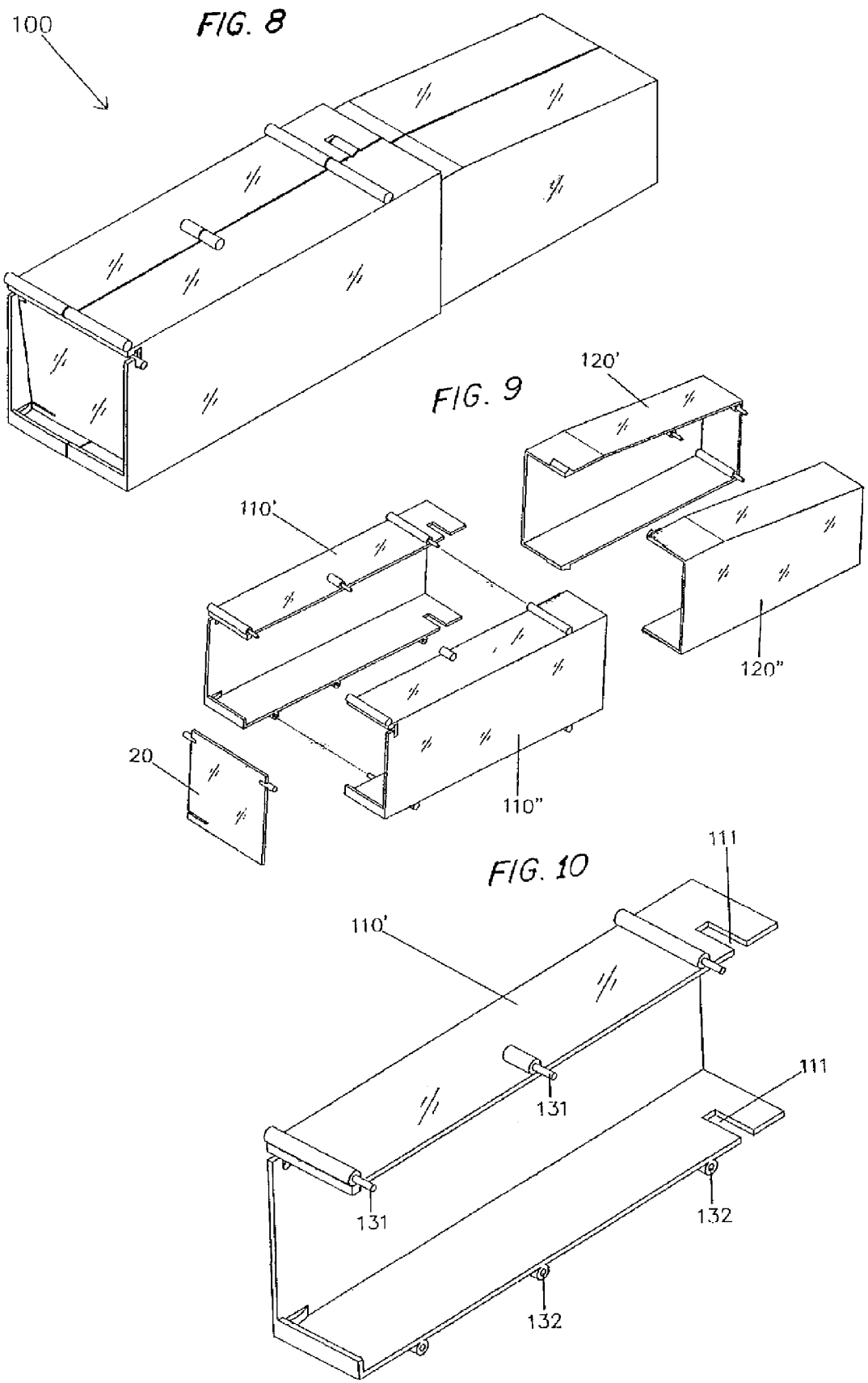

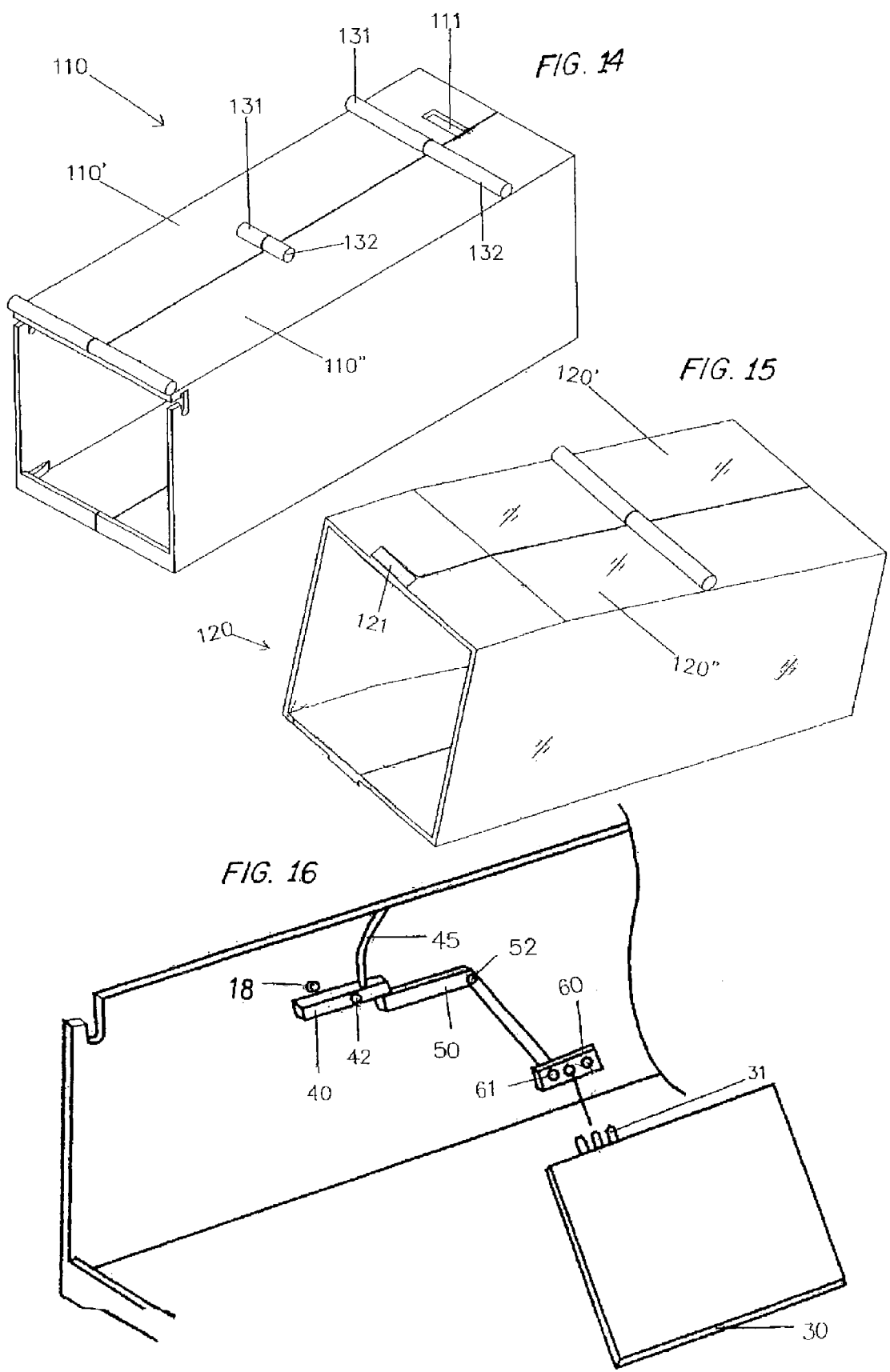

ANIMAL TRAP

BACKGROUND OF THE INVENTION

1. Field of the Invention

The present invention relates to an animal trap for trapping animals such as rats or squirrels which can be reused or disposed of without requiring handling of the animal trapped therein, and which can be easily assembled and taken apart.

2. Discussion of the Background

Undesired animals such as rats or squirrels can become pests that spread diseases and harm farming, ranching and adversely affect the human life. Poisons are often used to kill these animals. Poisoned animals do not die right after consumption of the poison, but rather travel to unknown places and then die. Therefore, because it is difficult to locate and dispose of the dead poisoned animals, the dead animals start decomposing and emit odor.

For the reasons stated above, use of animal traps is advantageous because it does not require use of poison to kill the animals and it is easy to locate the trapped animals.

Heretofore, although most animal traps have generally served their intended purpose, they have been subject to one or more of the following disadvantages:

1. They have been complicated in construction and thus difficult and expensive to manufacture;
2. They have been unreliable in operation;
3. They have been difficult to handle because of their weight or construction;
4. They have been difficult to set because of their construction and, in some cases, have been dangerous to the user in setting them because of a sensitive setting mechanism which can release the trap while being handled by the user;
5. They have been so constructed as to require the handling of a dead animal caught therein if the trap is to be reused; and/or
6. They often require the user to kill the trapped animal if the trapped animal is still alive, which is not desirable for the user.

The animal trap of the present invention is not subject to any of the above-mentioned disadvantages and possesses many advantages not found in the traps in use at present or in the past.

SUMMARY OF THE INVENTION

To achieve these and other advantages and in accordance with the purpose of the present invention, as embodied and broadly described herein, the present invention provides in one aspect an animal trap, including a housing having an open end, a door pivotally mounted to the housing and movable between an open position and a closed position, the door including a slit therein at a lower portion of the door to form an elastic portion below the slit, a close latch provided on the housing near the open end, the close latch cooperable with the elastic portion to retain the door in the closed position by latching the elastic portion between the close latch and the door stop.

In another aspect, the animal trap of the present invention provides an assemblable housing including a first portion having at least one protrusion, a second portion having at least one hole into which the at least one protrusion of the first portion fits. The first portion and the second portion are connectable together by inserting the at least one protrusion of the first portion into the at least one hole of the second portion.

In another aspect, the animal trap of the present invention provides a trigger linkage including, a first elongated member having a first treadle receiver, and a treadle extending from the first treadle receiver, the treadle and the first receiver configured to be readily attachable and detachable from one another.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is an enlarged perspective view of portions of the animal trap;

FIG. 4 is a perspective view of a door for the animal trap;

FIG. 5 is a side view of the animal trap in operation;

FIG. 6 is a side view of the animal trap in operation;

FIG. 7 is a side view of the animal trap in operation;

FIG. 8 is a perspective view of another embodiment of an animal trap, after assembly;

FIG. 9 is a perspective view of the animal trap of FIG. 8, before the assembly;

FIG. 10 is a perspective view of the left front portion of the animal trap of FIG. 8;

FIG. 14 is a perspective view of the front portion of the animal trap of FIG. 5;

FIG. 15 is a perspective view of the back portion of the animal trap of FIG. 8;

FIG. 16 is a perspective cut-out view of the animal trap with a door switch and a treadle;

DESCRIPTION OF THE PREFERRED EMBODIMENTS

Figure 1:
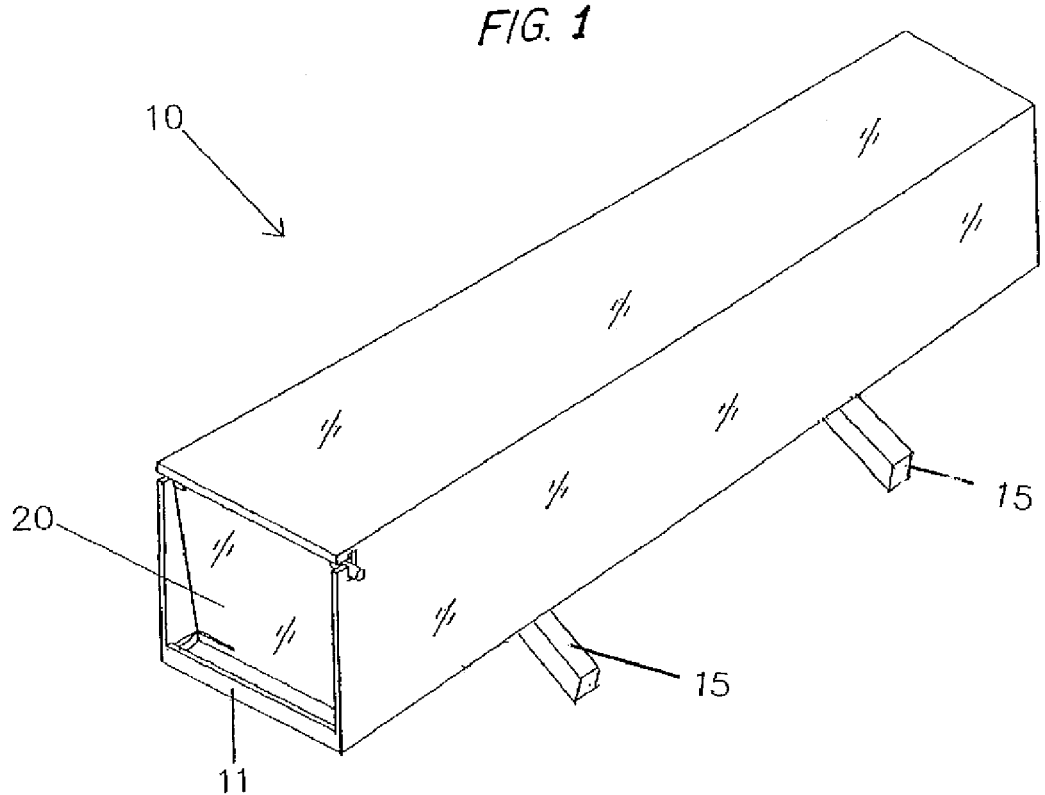
FIG. 1 is a perspective view of an animal trap in accordance with the present invention, after assembly.

Referring now to the drawings, wherein like reference numerals designate identical or corresponding parts throughout the several views, and more particularly to FIG. 1 thereof, obviously, numerous modifications and variations of the present invention are possible in light of the above teachings. It is therefore to be understood that within the scope of the appended claims, the invention may be practiced otherwise than as specifically described herein.

Referring to FIG. 1, the animal trap is made of a rectangular housing 10 that is completely enclosed except for only one opening where an animal can enter and the door 20 is installed at the opening. Thus, an animal that enters the animal trap through the door 20 cannot exit the animal trap without going through the door 20. The housing 10 can include at least one housing support 15 attached to the housing 10 to prevent the housing 10 from rolling or tipping.

Figure 2:
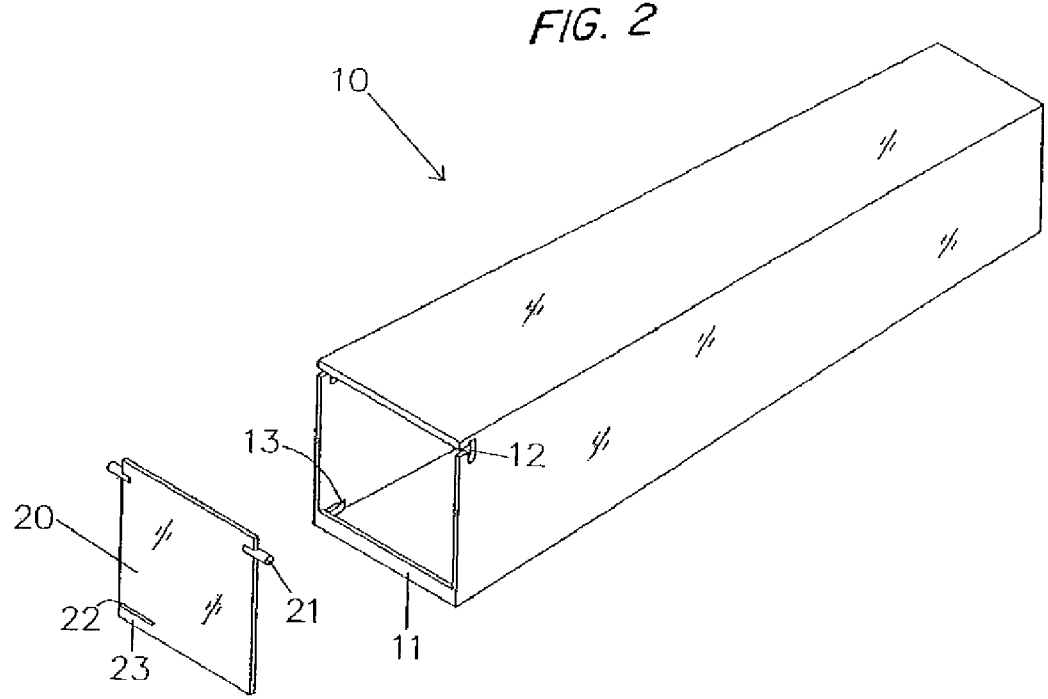
FIG. 2 is a perspective view of the animal trap, before the assembly.
Figure 11:
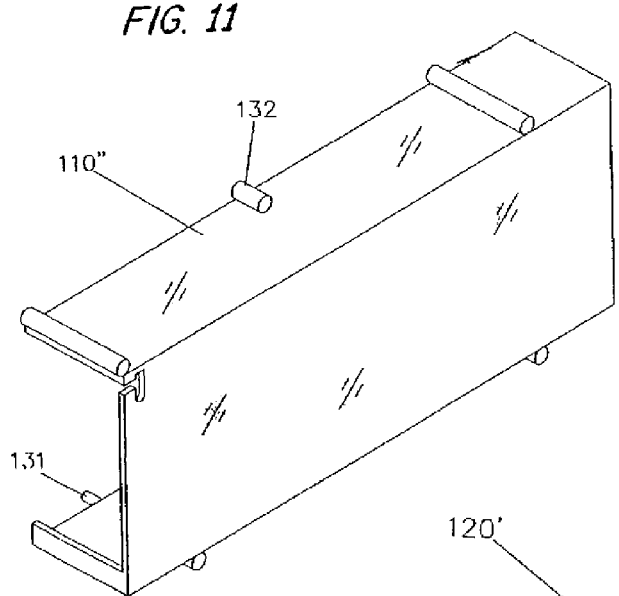
FIG. 11 is a perspective view of the right front portion of the animal trap of FIG. 8.
Figure 12:
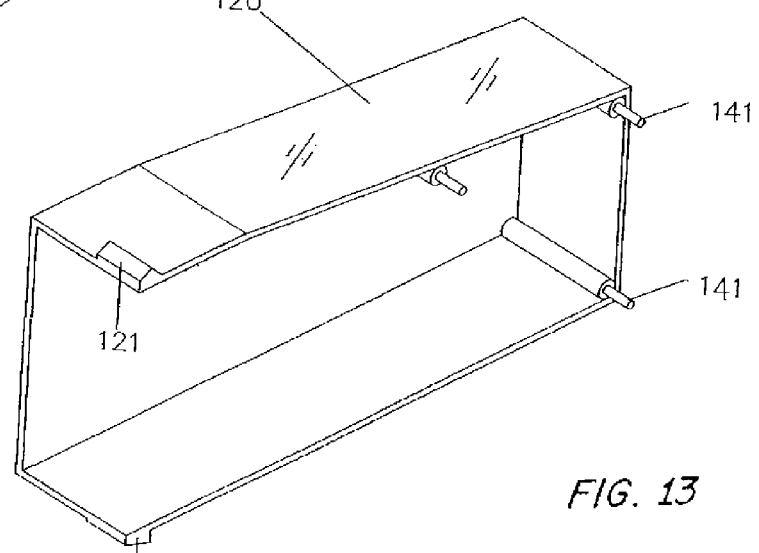
FIG. 12 is a perspective view of the left back portion of the animal trap of FIG. 8.
Figure 13:
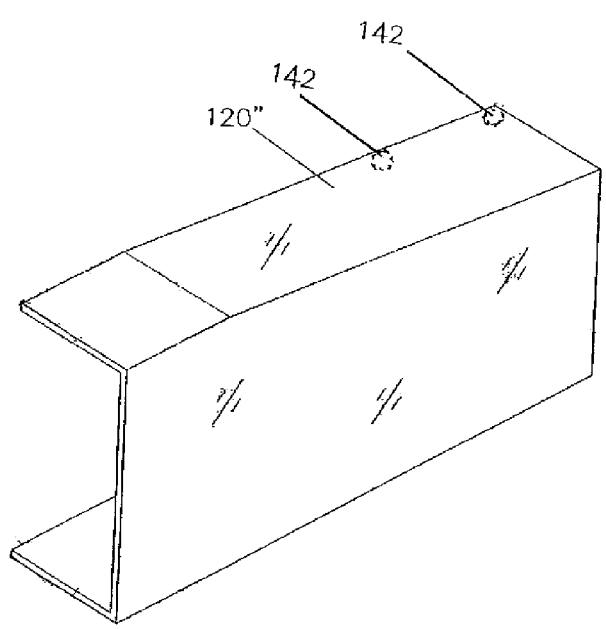
FIG. 13 is a perspective view of the right back portion of the animal trap of FIG. 8.

Referring to FIGS. 2 and 3, the door 20 is removable and can be installed pivotally at the open end by inserting the left and right protrusions 21 into the left and right holes 12, respectively. The holes 12 are formed such that the user can slide the protrusions 21 into the holes 12 and push the protrusions 21 downward to secure the door. The door 20 also includes an elastic portion 23 formed below a slit 22 on a bottom side portion of the door 20. As seen in the figures, especially FIGS. 3 and 4, the slit 22 is formed by creating a cut through the door 20. The slit extends to the edge of the door. As shown in FIGS. 6 and 7, a door stop 11 formed at a lower portion of the open end limits the door 20 to open toward an inside the housing 10 and to prevent the door 20 from opening toward an outside the housing. As shown in FIGS. 2 and 7, a close latch 13 installed near the open end is capable of keeping the door 20 in a closed position by latching the elastic portion 23 between the close latch 13 and the door stop 11. Because the elastic portion 23 is elastic, the elastic portion 23 easily latches between the close latch 13 and the door stop 11.

The housing and the door of the animal trap are made of resilient material with some flexibility, such as plastic or synthetic resin. The flexibility of the material allows elasticity of the elastic portion 23 to slightly bend while sliding over the close latch 13 and to latch between the close latch 13 and the door stop 11. The flexibility of the material also allows easy assembly of the door. The housing and the door of the animal trap can also be made of transparent or semi-transparent material, to allow the user to see whether an animal is trapped in the animal trap.

FIG. 4 shows an enlarged view of the door 20. A strengthening portion 24 formed above the slit 22 makes a portion above the slit 22 thicker than a rest of the door. The strengthening portion 24 is beneficial because the animal may detect the slit 22 and chew around the slit 22, damaging the door 20. With the extra thickness provided by the strengthening portion 24, it is more difficult for the animal to damage the door 20 around the slit 22.

As shown in FIGS. 3 and 4, a top portion of the open end includes a hump 14 and a top portion of the door comprises a hook 25. The hook 25 prevents the left and right protrusions 21 from sliding out from the left and right holes 12 by engaging with the hump 14 when the door 20 is completely lifted. For example, because the hook 25 is slanted in only one side, the protrusions 21 of the door in a lifted position can slide into the holes 12 without much resistance from the hump 14, but cannot easily slide out because the non-slanted side of the hook 25 engages with the hump 14, thereby securing the position of the door.

Referring to FIGS. 5-7, it is preferable that there is a gap between the door 20 and the bottom of the housing 10 when the door 20 closes. The smell of the bait 80 placed inside the housing 10 can escape through the gap between the door 20 and the bottom of the housing 10, and attract an animal. The bait 80 is preferably placed inside the housing 10 as far away from the opening as possible.

When the trap is set, as shown in FIG. 5, the elastic portion 23 rests on the close latch 13 without latching between the close latch 13 and the door stop 11. Thus, the animal can easily enter the housing 10 by lifting the door 20 as the door 20 swings open inwardly as shown in FIG. 6. Once the animal enters the housing 10, the door 20 closes by itself due to the weight of the door, back to the position shown in FIG. 5. If the animal attempts to exit the housing 10 by pushing the door 20 from inside, the elastic portion 23 latches between the close latch 13 and the door stop 1, securing the door 20 in one position, as shown in FIG. 7.

The animal trap can be designed to be assemblable, as shown in FIGS. 9-15. This embodiment includes a front left portion 110' having at least one protrusion 131, a front right portion 110" having at least one hole 132 that the at least one protrusion 131 of the front left portion 110' fits, a back left portion 120' having at least one protrusion 131, and a back right portion 120 having at least one hole that the at least one protrusion of the back left portion fit.

As shown in FIG. 14, the front portion 110 can be formed by assembling the front left portion 110' and the front right portion 110" by inserting the at least one protrusion 131 of the front left portion 110' into the at least one hole 132 of the front right portion 110". Similarly, as shown in FIG. 15, a back portion 120 can be formed by assembling the back left portion and the back right portion by inserting the at least one protrusion of the back left portion into the at least one hole of the back right portion. The housing 100 can be completed inserting an assembly engager 121 of the back portion 120 into an assembly hole 111 of the front portion 110. The assembly engager 121 and the assembly hole 111 are preferably provided on the left side to guide the orientation of the front portion 110 and the back portion 120 during assembly.

The assemblable animal trap is advantageous in that it can be disassembled and the parts of the disassembled animal trap can be stacked together to save space. When stacked together, the disassembled animal trap can fit in a packaging box half the size of the actual assembled animal trap. Hence, with the reduced volume of the disassembled animal trap, more animal traps can be stored in a limited space, thus reducing a storing cost and/or a shipping cost. Moreover, because the assembly of the assemblable animal trap is not performed by the manufacturer but is rather performed by the user, the manufacturing cost is decreased.

Figure 17:
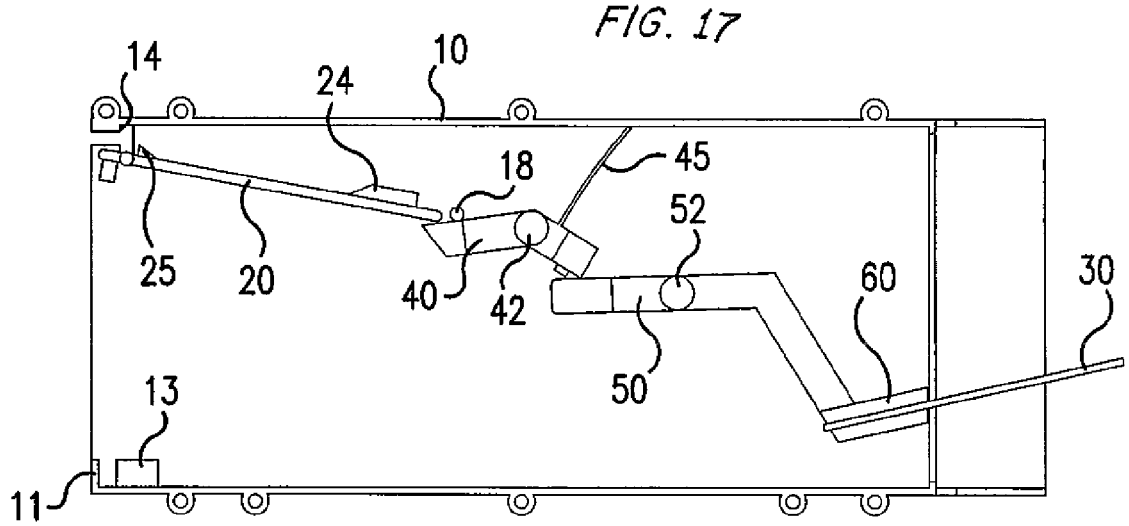
FIG. 17 is a side view of the animal trap of FIG. 16 in operation.
Figure 18:
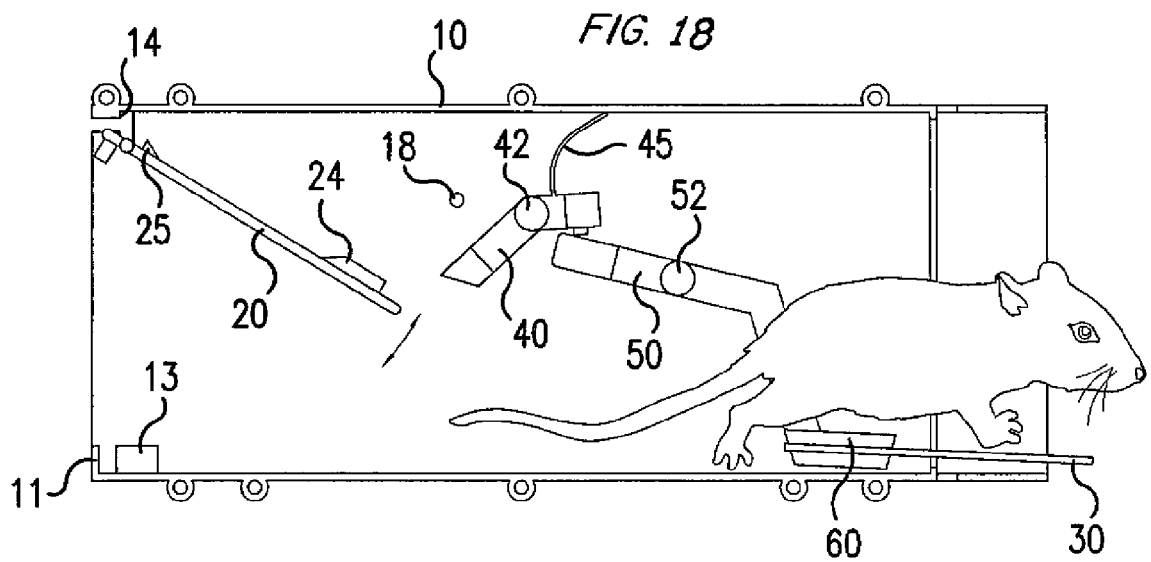
FIG. 18 is a side view of the animal trap of FIG. 16 in operation.

Referring to FIGS. 16-18, the animal trap can further include a door switch 40 capable of propping the door 20 open, a first elongated member 50 having a first treadle receiver 60 at one end and being linked to the door switch 40 at the other end, and a treadle 30 extended out from the first treadle receiver 60. The door switch stop 18 is provided on the wall of the housing to restrain the movement of the door switch 40. The door switch 40 and the first elongated member 50 are attached on the inside of the same wall of the housing. The treadle 30 is attachable to and removable from the first treadle receiver 60, and thus allows easy assembly and disassembly. For example, the treadle protrusions 31 can be inserted into the first treadle receiver holes 61 to complete the assembly. Additional second elongated member attached to another wall having a second treadle receiver at one end can be used for more stability (not shown in the Figures). In this instance, the treadle 30 is attachable to and removable from both the second treadle receiver (not shown in the Figures) and the first treadle receiver 60.

When an animal steps on the treadle 30, the weight of the animal moves the first elongated member 50 through the treadle 30 to cause the door switch 40 to close the door 20. For example, both the first elongated member 50 and the door switch 40 can be pivotally installed so that the first elongated member 50 rotates with respect to the first elongated member pivot 52 and the door switch 40 rotates with respect to the door switch pivot 42. The elastic portion 23 of the door 20 can latch on the door switch 40, as shown in FIG. 17, and the door 20 will be kept in the lifted position. In this instance, the elasticity of the elastic portion 23 makes it easy for the door 20 to smoothly latch on the door switch 40. Then, when the animal steps on the treadle 30, the first elongated member 50 will move clockwise, triggering the door switch 40 to move counter-clockwise by lifting one end of the door switch 40. As the door switch 40 moves counter-clockwise, the door 20 is released from the door switch 40, as shown in FIG. 18.

The door switch 40 is elastically installed such that the door switch returns to the initial position after the animal steps off the treadle 30. The elastic arm 45 can be used to provide such elasticity for the door switch 40, wherein the elastic arm bends or stretches as the door switch 40 rotates.

The animal trap of the present invention is a simple and effective animal trap to trap animals such as rats or squirrels. Because the animal trap is enclosed except at the open end covered by the door, an animal trapped inside cannot exit the animal trap. Therefore, the trapped animal can suffer from suffocation and/or dehydration, which will eventually kill the animal in approximately two to three days. This is advantageous because the user does not need to kill the trapped animal, but rather can wait till the animal dies of suffocation or dehydration.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An animal trap, comprising:
   a housing having an open end;
   a door pivotally mounted to the housing and movable between an open position and a closed position, the door including a first side edge and a second side edge;
   a slit integrally formed in the door at a lower portion of the door to form an elastic portion below the slit, the elastic portion being integrally formed with the door, the slit extending to one of the side edges; and
   a close latch provided on the housing near the open end, the close latch cooperable with the elastic portion to retain the door in the closed position.

2. The animal trap of claim 1, wherein the door is pivotally mounted adjacent to an upper side of the housing.

3. The animal trap of claim 2, wherein the door can move from the open position to the closed position by the weight of the door.

4. The animal trap of claim 1, further comprising a door stop formed at the open end on the housing to allow the door to open toward an inside the housing and to restrain the door from opening toward an outside of the housing.

5. The animal trap of claim 4, wherein an engaging space is provided on the housing between the door stop and the close latch such that the elastic portion is engagable in the engaging space.

6. The animal trap of claim 1, further including a strengthening portion formed above the slit to make a portion above the slit thicker than a rest of the door.

7. The animal trap of claim 1, further including:
   a first protrusion protruding outward at a first portion of the door; and
   a second protrusion protruding outward at a second portion of the door,
   wherein the door is pivotally installed by inserting the first and the second protrusions into first and second holes, respectively, the first and the second holes being provided at the open end.

8. The animal trap of claim 7, wherein a top portion of the open end comprises a hump and a top portion of the door comprises a hook, the hook preventing the first and second protrusions from sliding out from the first and second holes by engaging with the hump.

9. The animal trap of claim 1, wherein the housing includes:
   a first portion having at least one protrusion; and
   a second portion having at least one hole into which the at least one protrusion of the first portion fits,
   wherein the first portion and the second portion are connectable together by inserting the at least one protrusion of the first portion into the at least one hole of the second portion.

10. The animal trap of claim 9, wherein the housing further includes:
    a third portion having at least one protrusion; and
    a fourth portion having at least one hole into which the at least one protrusion of the third portion fit,
    wherein the third portion and the fourth portion are connectable together by inserting the at least one protrusion of the third portion into the at least one hole of the fourth portion.

11. The animal trap of claim 10, wherein the first portion and the second portion are connected to form a first member, and the third portion and the fourth portion are connected to form a second member, the first member having an assembly hole and the second member having an assembly engager,
    wherein the housing is formed by inserting the assembly engager of the second member into the assembly hole of the first member.

12. The animal trap of claim 1, further comprising a trigger linkage, the trigger linkage including:
    a first elongated member having a first treadle receiver; and
    a treadle extending from the first treadle receiver, the treadle and the first treadle receiver configured to be readily attachable and detachable from one another.

13. The animal trap of claim 12, the trigger linkage further including:
    a door switch capable of propping the door open, the door switch being cooperative with the elastic portion to retain the door in the open position,
    wherein the first elongated member is linked to the door switch at an end without the first treadle receiver, the door switch and the first elongated member being attached on an inside of a same wall of the housing, and
    wherein, when an animal steps on the treadle, the weight of the animal presses down the treadle, which moves the first elongated member via the treadle to cause the door switch to release the door to close.

14. The animal trap of claim 13, wherein the door switch and the first elongated member are pivotally installed such that, when the animal steps on the treadle, the first elongated member moves clockwise, triggering the door switch to move counter-clockwise by lifting one end of the door switch and to release the door to close.

15. The animal trap of claim 12, further comprising a second elongated member attached to another wall of the housing having a second treadle receiver at one end, wherein the treadle and the second treadle receiver are configured to be readily attachable and detachable from one another.

16. The animal trap of claim 1, further comprising at least one housing support attached to the housing to prevent the housing from rolling or tipping.

17. The animal trap of claim 1, wherein the slit is in a fixed position with respect to the door.

18. An animal trap, comprising:
- a housing having an open end;
- a door pivotally mounted to the housing and movable between an open position and a closed position, the door including a first side edge and a second side edge;
- a slit at a lower portion of the door to form an elastic portion below the slit, the slit extending to one of the side edges; and
- a close latch provided on the housing near the open end, the close latch cooperable with the elastic portion to retain the door in the closed position,
- wherein the slit is in a fixed position with respect to the door.

19. The animal trap of claim 18, further comprising a trigger linkage, the trigger linkage including:
- a first elongated member having a treadle and a treadle receiver;
- a door switch capable of propping the door open, the door switch being cooperative with the elastic portion to retain the door in the open position,
- wherein the first elongated member is linked to the door switch at an end without the first treadle receiver, and
- wherein, when an animal steps on the treadle, the weight of the animal presses down the treadle, which moves the first elongated member via the treadle to cause the door switch to release the door to close.

20. The animal trap of claim 18, wherein the door further includes
- a first protrusion protruding outward at a first portion of the door; and
- a second protrusion protruding outward at a second portion of the door,
- wherein the door is pivotally installed by sliding the first and the second protrusions through first and second cuts into first and second holes, respectively, the first and the second holes being provided at the open end and being open towards the open end and the first and second cuts being connected with the first and second holes, respectively, and
- wherein a top portion of the open end comprises a hump and a top portion of the door comprises a hook, the hook preventing the first and second protrusions from sliding out from the first and second holes through first and second cuts by engaging with the hump.

\* \* \* \* \*